(12) United States Patent
Mayr et al.

(10) Patent No.: US 7,763,323 B2
(45) Date of Patent: Jul. 27, 2010

(54) CROSS-LINKED POLYESTER PROTECTIVE COATINGS

(75) Inventors: Peter Mayr, Laxenburg (AT); James Robinson, Glentrees (SG); Fritz Altmann, Wagen (CH)

(73) Assignee: Valspar Sourcing, Inc., Minneapolis, MN (US)

( * ) Notice: Subject to any disclaimer, the term of this patent is extended or adjusted under 35 U.S.C. 154(b) by 1359 days.

(21) Appl. No.: 11/220,354

(22) Filed: Sep. 6, 2005

(65) Prior Publication Data
US 2007/0054140 A1 Mar. 8, 2007

(51) Int. Cl.
B05D 3/02 (2006.01)
B05D 7/00 (2006.01)

(52) U.S. Cl. .................. 427/409; 427/480; 427/402; 427/384

(58) Field of Classification Search .................. 427/409
See application file for complete search history.

(56) References Cited

U.S. PATENT DOCUMENTS

| 5,260,138 | A | 11/1993 | Hohlein et al. |
| 6,136,455 | A | 10/2000 | Anyashiki et al. |
| 6,262,186 | B1 | 7/2001 | Van Gaalen et al. |
| 6,423,771 | B1 | 7/2002 | Dworak et al. |
| 6,680,358 | B2 | 1/2004 | Wamprecht et al. |
| 6,787,188 | B1 * | 9/2004 | Metcalfe .................. 427/372.2 |
| 6,924,328 | B2 | 8/2005 | Legleiter et al. |
| 2005/0014012 | A1 * | 1/2005 | Stapperfenne et al. ...... 428/480 |

FOREIGN PATENT DOCUMENTS

| EP | 0411690 | * | 7/1990 |
| EP | 0 411 690 A1 | | 2/1991 |
| EP | 1498461 | | 1/2005 |

OTHER PUBLICATIONS

Notification of Transmittal of the International Search Report and the Written Opinion of the International Searching Authority for corresponding patent application No. PCT/US2006/033083, mailed Mar. 15, 2007, 10 pages.
Notification of Transmittal of the International Preliminary Report on Patentability for corresponding patent application No. PCT/US2006/033083, mailed Feb. 1, 2008, 11 pages.

* cited by examiner

*Primary Examiner*—Michael Barr
*Assistant Examiner*—Ryan Schiro

(57) ABSTRACT

The invention relates to protective coating systems derived from a functional polyester resin, a cross-linker and a phenol-formaldehyde resin. Also provided is a method of coating a metal substrate using the protective coating systems to produce a cross-linked protective coating. Further provided is a composite material prepared with the coating system and, in certain embodiments, useful in fabricating metal foodstuffs storage containers. The composite material may be particularly useful in fabricating foodstuffs storage containers and "easy-open" end closures wherein the cross-linked protective coating contacts the foodstuffs.

21 Claims, No Drawings

CROSS-LINKED POLYESTER PROTECTIVE COATINGS

TECHNICAL FIELD

The invention relates to protective coating compositions and methods for coating metal substrates useful in fabricating, for example, packaging containers. The invention further relates to methods for coating cross-linkable compositions on metal substrates useful in fabricating metal foodstuffs packaging containers and "easy-open" end closures wherein the protective coating contacts the foodstuffs.

BACKGROUND

Protective coatings are applied to the interior of metal food and beverage containers (e.g. cans) to prevent the contents from coming into contact with the metal surfaces of the containers. Contact of the container contents with the interior metal surface, especially where acidic products such as soft drinks and tomato juice are involved, can lead to corrosion of the metal container and result in contamination and deterioration of the contents. Protective coatings are also applied to the interior of food and beverage containers to prevent corrosion in the headspace of the container between the fill line of the food product and the container lid, which is particularly problematic with high salt content food products.

Metal container interiors are typically coated with a thin thermoset film to protect the interior metal surface from its contents. Various natural and synthetic resins and their blends have been used as interior can protective coatings, including poly(vinyl chloride) resins, epoxy-functional resins, alkyd/aminoplast resins and oleoresinous materials. These heat-curable compositions are usually applied as solutions or dispersions of one or more resin in volatile organic solvents.

The heat-cured protective coating compositions generally should exhibit sufficient adhesion and flexibility to maintain film integrity during container fabrication. Sufficient coating adhesion and flexibility also are needed for the coating composition to withstand processing conditions the container is subject to during product packaging. Other desired performance features of the cured coatings include corrosion protection and sufficient chemical, abrasion and mar resistance. The coatings used on the interior of metal food containers preferably also meet government regulatory criteria.

Multi-coat coating systems recently have been used to coat the interior of food and beverage containers, wherein the over-coat or lacquer contains an epoxy resin cross-linked with a phenolic resin. Such epoxy-based "Gold lacquers" typically exhibit good adhesion and can be used for storing acidic foodstuffs and beverages. However, there is a perception that some epoxy-based coatings; containing mobile Bisphenol A (BPA), Bisphenol F (BPF), Bisphenol A diglycidyl ether (BADGE) and Bisphenol F diglycidyl ether (BFDGE); are less desirable for foodstuffs storage.

Currently, the food packaging industry and consumer groups are seeking coated metal packaging articles prepared from coating compositions free from mobile BPA, BPF, BADGE and BFDGE; exhibiting excellent corrosion and chemical resistance; and acceptable adhesion and flexibility during container fabrication. The art continues to seek an ideal coating composition for use as a protective coating for metal foodstuffs containers.

SUMMARY OF THE INVENTION

The present invention is directed to hardenable protective coating compositions for coating metal substrates. The present invention is also directed to protective coating compositions substantially free of mobile BPA, BPF and BADGE and BFDGE. The present invention is further directed to methods useful in applying protective coatings to the interior lining of metal containers suitable for contact with foodstuffs. For example, an exemplary cured coating composition of the present invention demonstrates adequate chemical and physical properties for use as a protective coating system on the interior of metal containers and "easy open" end closures used in packaging foods and beverages.

One aspect of the present invention provides a hardenable packaging coating composition including a hydroxyl-functional polyester resin, a carboxyl-functional polyester resin, a cross-linker and a phenol-formaldehyde resin. In certain presently preferred embodiments, the hardenable packaging coating composition is substantially free of mobile BPA, BPF, BADGE and BFDGE.

In another aspect, the present invention provides a hardenable packaging coating composition including a functional polyester resin, a blocked-isocyanate cross-linker and a phenol-formaldehyde resin. In certain presently preferred embodiments, the hardenable packaging coating composition includes at least one of a carboxyl-functional polyester resin and a hydroxyl-functional polyester resin. In one particular preferred embodiment, the hardenable packaging coating composition further includes one or more of a resole-formaldehyde resin, a substantially nonaqueous carrier liquid, a catalyst, or a pigment.

In another aspect, the present invention provides a method for coating a metal substrate with a hardenable packaging coating composition according to the present invention. The method includes applying a first hardenable coating composition to at least one surface of a metal substrate; applying a second hardenable coating composition over the first hardenable coating composition, wherein the second hardenable coating composition includes a hydroxyl-functional polyester resin, a carboxyl-functional polyester resin, a cross-linker, and a phenol-formaldehyde resin; and curing the first and second hardenable coating compositions to provide a hardened composite coating on the metal substrate.

In some embodiments, the chemical composition of the first hardenable coating composition is chemically distinct from the chemical composition of the second hardenable coating composition. In one presently preferred embodiment, the first hardenable coating composition is substantially identical in chemical composition to the second hardenable coating composition. In other presently preferred embodiments, each of the first and second hardenable coating compositions is applied at a coating weight of from about 6 to about 12 grams per square meter on a non-volatile solids basis.

In another aspect of the present invention, a metal foodstuffs container is provided, wherein at least an interior surface of the container is coated with a hardened packaging coating composition according to the present invention. Preferably the metal foodstuffs container is a multi-part can with at least one "easy-open" end closure having at least an interior surface of the can and the end closure coated with the hardened packaging coating compositions according to the present invention.

The hardened composite packaging coating composition preferably maintains metal corrosion inhibition, imparts chemical resistance to foodstuffs exposure, and achieves cured film integrity with good metal substrate adhesion and flexibility sufficient for container fabrication. In certain preferred embodiments, the hardened composite coating composition also provides improved resistance to acidic foodstuffs, and is particularly useful in fabricating containers having "easy-open" end closures.

The details of one or more embodiments of the invention are set forth in the following Detailed Description of the Preferred Embodiments.

DETAILED DESCRIPTION OF THE PREFERRED EMBODIMENTS

Definitions

As used herein, the term "BADGE and BFDGE" denotes compounds selected from the group consisting of Bisphenol A diglycidyl ether (BADGE) [2,2'-bis(4-hydroxyphenyl)propane bis(2,3-epoxypropyl)ether], and Bisphenol F diglycidyl ether (BFDGE) in both the uncured and cured state.

The term "substantially free" of a particular mobile compound means that the compositions of the present invention contain less than 100 parts per million (ppm) of the recited mobile compound.

The term "essentially free" of a particular mobile compound means that the composition of the present invention contains less than 5 parts per million of the recited mobile compound.

The term "completely free" of a particular mobile compound means that the compositions of the present invention contain less than 20 parts per billion (ppb) of the recited mobile compound.

The term "mobile" means that the compound can be extracted from the cured coating when a coating (typically approximately 1 mg/cm$^2$ thick) is exposed to a 10 weight percent (i.e. 10% w/w) ethanol solution for two hours at 121° C. followed by exposure for 10 days in the solution at 49° C.

If the aforementioned phrases are used without the term "mobile" (e.g., "substantially free of BPA, BPF, BADGE and BFDGE") then the compositions of the present invention contain less than the aforementioned amount of the compound whether the compound is mobile in the coating or bound to a constituent of the coating.

As used herein, the term "multi-coat coating system" is defined as a coating system requiring the application of at least two coated layers to a particular substrate surface. The coated layers may be chemically distinct (e.g. a "two-coat coating system" using a first-coat composition chemically distinct from the second-coat composition) or chemically identical (e.g. "a two-pass coating system" using a first-coat composition that has a chemical composition substantially identical to the second-coat composition).

The term "two-coat coating system" is defined as a multi-coat coating system in which only two chemically distinct coating compositions are applied to a particular substrate surface.

The term "first-coat composition" is defined as the coating composition to be applied to the surface of a substrate or between a surface of a substrate and a "second-coat composition," and is synonymous with base-coat, primer or size for a two-coat coating system.

The term "second-coat composition" is defined as the coating composition to be applied over an applied first-coat composition, and is synonymous with top-coat or lacquer for a two-coat coating system.

The term "cured coating composition" is defined as the adherent (co)polymeric coating residing on a substrate resulting from at least partially curing or hardening a coating composition, for example, by film formation, cross-linking, and the like.

The term "coating solids" is defined as including all non-volatile materials that remain in the "cured coating composition" on the coated substrate after curing.

The term "(co)polymer" is defined as a macromolecular homopolymer derived from a single reactive entity (e.g. monomer) or a macromolecular copolymer derived from multiple reactive entities, or mixtures thereof.

The term "functional polyester resin" is defined as a polyester (co)polymer including one or more hydroxyl groups and/or one or more carboxyl groups.

The term "dispersed in" with respect to a polymer "dispersed in" a carrier liquid means that the polymer can be mixed into a carrier liquid to form a macroscopically uniform, single phase or multiphase (e.g. solid/liquid) fluid mixture, and is intended to include solutions and mixtures wherein the carrier liquid solvates, swells, and completely or partially-solubilizes the dispersed polymer.

The term "substantially nonaqueous carrier liquid" is used to denote a carrier liquid in which water, if present at all, constitutes less than about 5% w/w of the carrier liquid.

The term "cross-linker" is used to denote a chemical compound containing two or more chemical groups capable of undergoing inter- or intra-molecular chemical reaction.

The term "easy open" with respect to an end closure refers to a container end or lid that is partially cut through during manufacture, leaving intact the interior protective coating, to facilitate opening of the can by the consumer using a ring-pull or similar opener. Such containers may be particularly useful for storage of vacuum-packed foodstuffs.

Exemplary Coating Compositions

The present invention relates to hardenable coating compositions and protective coating systems for metal substrates including a functional polyester resin, a cross-linker, and a phenol-formaldehyde resin. In presently preferred embodiments, the functional polyester resin is a mixture of a hydroxyl-functional polyester resin and a carboxyl-functional polyester resin, and the cross-linker is a blocked-isocyanate cross-linker containing at least two blocked isocyanate groups. In more preferred embodiments, the hardenable coating composition includes one or more of a resole-formaldehyde resin, a substantially nonaqueous carrier liquid, a catalyst or a pigment. The hardenable coating compositions are preferably substantially free of mobile BPA, BPF, BADGE and BFDGE. More preferably, the coating compositions are essentially free of mobile BPA, BPF, BADGE and BFDGE. Most preferably, the coating compositions are completely free of BPA, BPF, BADGE and BFDGE.

The coating composition contains at least one functional polyester resin. A single functional polyester resin or a mixture of one or more functional polyester resins may be used according to the present invention. The functional polyester resin or mixture of resins is typically present in the coating composition in an amount from about 50% to about 99%, more preferably from about 70% to about 95%, most preferably from about 75% to about 90% w/w on a non-volatile solids basis.

The chemical composition of the functional polyester resin broadly encompasses polyester resins containing one or more hydroxyl and/or carboxyl groups. Suitable polyester resins may be saturated, unsaturated, linear or branched, provided the resin contains at least one hydroxyl or carboxyl functional group. In some embodiments, a single functional polyester resin containing at least one hydroxyl and at least one carboxyl group may be used. In such embodiments, the polyester resin typically exhibits a hydroxyl number of from about 5 to about 150 mg KOH per gram of functional polyester resin on a non-volatile solids basis, and a carboxyl number of from about 50 to about 250 mg KOH per gram of functional polyester resin on a non-volatile solids basis.

In certain presently preferred embodiments, mixtures of a hydroxyl-functional polyester resin and a carboxyl-functional polyester resin are used, preferably at a weight ratio of hydroxyl-functional polyester resin to carboxyl-functional polyester resin of from about 50 to 1 to about 600 to 1 parts by weight on a non-volatile solids basis. Preferably, the amount of carboxyl-functional polyester resin in the coating composition is from about 0% to about 5% w/w, more preferably from about 0.1% to about 1.5% w/w, most preferably from about 0.3% to about 0.5% w/w of the coating composition on a non-volatile solids basis.

When a mixture of a hydroxyl-functional and a carboxyl-functional polyester resin is used, the hydroxyl-functional polyester resin preferably exhibits a hydroxyl number from about 5 to about 200 mg KOH per gram, more preferably from about 50 to about 175 mg KOH per gram, most preferably from about 75 to about 150 mg KOH per gram functional polyester resin on a non-volatile solids basis. Similarly, the carboxyl-functional polyester resin is preferably selected to exhibit an acid number (AN) of about 100 to about 300 mg KOH/g, more preferably from about 150 to about 275 mg KOH/g, most preferably from about 180 to about 250 mg KOH/g functional polyester resin on a non-volatile solids basis.

Acid number may be determined using the titrimetric method described in ISO Standard XP-000892989. Hydroxyl number may be determined using the same standard test method, substituting a solution of hydrochloric acid in ethanol for the potassium hydroxide in ethanol titrant, and expressing the neutralization endpoint equivalents of hydrochloric acid in terms of the molar equivalents of potassium hydroxide.

The preferred functional polyester resins according to the present invention are typically macromolecules exhibiting a number average molecular weight from about 500 to about 10,000 Daltons (Da), more preferably from about 1,000 to about 7,500 Da, most preferably from about 2,000 to about 5,000 Da. In some embodiments, the functional polyester resin exhibits a glass transition temperature ($T_g$) greater than about 50° C., more preferably greater than about 60° C. Preferably, the functional polyester resin exhibits a $T_g$ less than about 100° C., more preferably less than about 90° C.

Suitable functional polyester resins are typically prepared by condensation (esterification) according to known processes [see, for example, Zeno Wicks, Jr., Frank N. Jones and S. Peter Pappas, *Organic Coatings: Science and Technology*, Vol. 1, pp. 122-132 (John Wiley & Sons: New York, 1992)]. The functional polyester resin is usually derived from a mixture of at least one poly-functional alcohol (polyol), generally a dihydroxy or trihydroxy alcohol, esterified with excess equivalents of a mixture of at least one dicarboxylic acid or anhydride, generally an aromatic dicarboxylic acid or anhydride.

The functional polyester resins are typically prepared from an aromatic or aliphatic polycarboxylic acid or anhydride, and an aromatic or aliphatic diol, triol, or polyol. The diol, polycarboxylic acid and/or anhydride are combined in correct proportions and chemically reacted using standard esterification (condensation) procedures to provide a polyester having functional groups at the terminal ends of the polyester resin, preferably hydroxyl groups. Hydroxyl groups can be positioned at the terminal end of the polyester by utilizing excess diol, triol, or polyol in the reaction. A triol or polyol is typically used to provide a branched, as opposed to linear, polyester.

Examples of suitable polycarboxylic acids or anhydrides include, but are not limited to, maleic anhydride, maleic acid, fumaric acid, succinic anhydride, succinic acid, adipic acid, phthalic acid, phthalic anhydride, 5-tert-butyl isophthatic acid, tetrahydrophthalic anhydride, hexahydrophthalic anhydride, endomethylenetetrahydrophthalic anhydride, azelaic acid, sebacic acid, tetrachloro-phthalic anhydride, chlorendic acid, isophthalic acid, trimellitic anhydride, terephthalic acid, a naphthalene dicarboxylic acid, cyclohexane-dicarboxylic acid, glutaric acid, and mixtures thereof. It is also understood that an esterifiable derivative of a polycarboxylic acid, such as a dimethyl ester or anhydride of a polycarboxylic acid, can be used to prepare the polyester.

Customarily, dicarboxylic acids and their esterifiable derivatives are used, for example phthalic acid, isophthalic acid, terephthalic acid, 1,4-cyclohexanedicarboxylic acid, succinic acid, sebacic acid, methyltetrahydrophthalic acid, methylhexahydrophthalic acid, tetrahydrophthalic acid, dodecanedioic acid, adipic acid, azelaic acid, naphthalenedicarboxylic acid, pyromellitic acid and/or dimer fatty acids, acid anhydrides thereof and/or lower alkyl esters, for example methyl esters. Tri-carboxylic acids, e.g. trimellitic acid, may also be used.

Preferred polycarboxylic acids and their esterifiable derivatives contain aromatic functionality. Examples of preferred aromatic dicarboxylic acids are phthalic acid, terephthalic acid, isophthalic acid and dimer fatty acid; trimellitic acid is a preferred aromatic tricarboxylic acid. Particularly preferred are terephthalic and isophthalic acid. The anhydride derivatives of these acids can also be used if they exist as anhydrides.

Preferably less than 10% w/w of the dicarboxylic acid content comprises other aliphatic polyfunctional carboxylic acids. Examples of other aliphatic polyfunctional carboxylic acids are malonic acid, succinic acid, glutaric acid, adipic acid, azelaic acid, suberic acid, sebacic acid, dimer fatty acids, maleic acid and dimer fatty acids. Hydroxy acids can also be included in the polyester such as 12-hydroxy stearic acid, lactic acid and 2-hydroxy butanoic acid.

Examples of suitable diols, triols, and polyols include, but are not limited to, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, trimethylol propane, hexylene glycol, cyclohexanedimethanol, a polyethylene or polypropylene glycol having a weight average molecular weight ($M_w$) of about 500 Da or less, isopropylidene bis (p-phenylene-oxypropanol-2), and mixtures thereof.

The polyol mixture may include at least one tri-hydroxy alcohol (e.g. triol), but is predominantly composed of one or more di-hydroxy alcohol (e.g. glycol or diol). Suitable tri-hydroxy alcohols include, for example, trimethylolethane, trimethylopropane, pentaerythritol, dipentaerythritol and glycerol. Preferred triols are trimethylolethane and trimethylopropane. Suitable di-hydroxy alcohols include, for example, ethylene glycol, propylene glycol, 1,2- and/or 1,3-propanediol, diethylene glycol, dipropylene glycol, triethylene glycol, tetraethylene glycol, 1,4-butanediol, 1,3-butylethylpropanediol, 2-methyl-1,3-propanediol, 1,5-pentanediol, cyclohexanedimethanol, glycerol, 1,6-hexanediol, neopentyl glycol, pentaerythritol, trimethylolethane, trimethylolpropane, 1,4-benzyldimethanol and -ethanol, and 2,4-dimethyl-2-ethylhexane-1,3-diol.

Most preferred are diols include ethylene glycol, propylene glycol, diethylene glycol, and neopentyl glycol. One skilled in the art understands that to provide a hydroxyl-terminated polyester, the equivalent excess of polyol over dicarboxylic acid should generally be maintained from about 0.02 to about 0.784 on a molar basis, and preferably from about 0.04 to about 0.554 on a molar basis.

Similarly, one skilled in the art understands that to provide a carboxyl-terminated polyester, it is usually preferable to use a two-step process. First, one prepares a hydroxy-functional polyester, and then reacts the terminal hydroxyl groups with a molar excess of dicarboxylic acid. The equivalent excess of dicarboxylic acid over polyol generally should be maintained from about 0.02 to about 0.784 on a molar basis, and preferably from about 0.04 to about 0.554 on a molar basis. A modest amount (e.g. 1-5% w/w) of a tri-functional monomer, e.g. trimellitic anhydride, may be added to increase the number average carboxyl-functionality of the polyester resin.

Various commercially available functional polyester resins are suitable for use in the present invention. For example, exemplary URALAC™ polyester resins (e.g. URALAC ZW5007SH™, a hydroxyl-functional polyester resin available from DSM Resins U.S., Inc., Augusta, Ga.), exemplary Phenodur™ polyester resins (e.g. Phenodur 1150/50EPAC™, a carboxyl-functional polyester resin available from Cytec Surface Specialties, Inc., West Paterson, N.J.), exemplary VITEL® polyester resins (e.g. VITEL® PE-100 and PE-200 saturated hydroxyl- and carboxyl-functional polyester resins available from Goodyear Tire & Rubber Co., Akron, Ohio), and Dynapol™ polyester resins (e.g. Dynapol™ L and LH saturated hydroxyl-functional polyester resins available from Degussa, Corp., Parsippany, N.J.).

Coating compositions according to the present invention also contain a cross-linker, preferably at from about 0.1% to about 10%, more preferably from about 1% to about 5%, most preferably at from about 2% to about 4% w/w of the coating composition on a non-volatile solids basis (i.e. excluding optional solvents or carrier liquids). The cross-linker preferably contains two or more functional groups capable of undergoing chemical reaction with one or more of the hydroxyl-functional polyester resin, the phenol-formaldehyde resin, the carboxyl-functional polyester resin and and/or the optional cresol-formaldehyde resin.

The choice of particular cross-linker typically depends on the particular product being formulated. For example, some coating compositions are highly colored (e.g., gold-colored coatings). These coatings may typically be formulated using cross-linkers that themselves tend to have a yellowish color. In contrast, white or clear coatings are generally formulated using non-yellowing cross-linkers, or only a small amount of a yellowing cross-linker. Preferred cross-linkers are substantially free of mobile BPA, BPF, BADGE and BFDGE.

The cross-linker may be a single molecule, a dimer, an oligomer, a (co)polymer or a mixture thereof. Preferably, the cross-linker is a polymeric material, more preferably a (co)polymer. Any of the well-known class of amino-, hydroxyl- or isocyanate-functional cross-linkable (co)polymers can be used. For example, aminoplast and phenoplast (i.e. phenolic) cross-linkable resins containing two or more active hydrogen (e.g. amino or hydroxyl) groups may be used. Preferably, blocked isocyanate cross-linkers containing two or more blocked isocyanate groups, or an isocyanate group and a vinyl group, can be used in the coating compositions.

In certain presently preferred embodiments, the cross-linker is selected to be a blocked isocyanate having two or more isocyanate functional groups, or an isocyanate group and a vinyl group, capable of cross-linking with at least one component of the coating composition. Preferably, the blocked isocyanate is an aliphatic and/or cycloaliphatic blocked polyisocyanate, for example HDI (hexamethylene diisocyanate), IPDI (isophorone diisocyanate), TMXDI (bis [4-isocyanatocyclohexyl]methane), $H_{12}$MDI (tetramethylene-m-xylidene diisocyanate), TMI (isopropenyldimethylbenzylisocyanate) and dimers or trimers thereof. Preferred blocking agents include, for example, n-butanone oxime, ε-caprolactam, diethyl malonate, and secondary amines.

Suitable blocked isocyanate cross-linkers are commercially available. Examples of suitable commercially available blocked isocyanate cross-linkers include VESTANAT™ B 1358 A, VESTANAT™ EP B 1186 A, VESTANA™ EP B 1299 SV (all available from Degussa Corp., Marl, Germany); and DESMODUR™ VPLS 2078 and DESMODUR™ BL 3175 (available from Bayer A.G., Leverkusen, Germany).

Cross-linkable aminoplast resins may also be used, for example the condensation products of aldehydes such as formaldehyde, acetaldehyde, crotonaldehyde, and benzaldehyde with amino or amido group-containing substances such as urea, melamine and benzoguanamine. Examples of suitable aminoplast cross-linkers include, without limitation, (co)polymers containing two or more amino functional groups. Suitable aminoplast cross-linkers are commercially available, and include benzoguanamine-formaldehyde (co) polymers, melamine-formaldehyde (co)polymers, esterified melamine-formaldehyde (co)polymers, and urea-formaldehyde (co)polymers. One specific example of a useful aminoplast cross-linker is the fully alkylated melamine-formaldehyde (co)polymer commercially available from Cytec Industries (Cytec Industries GMBH, Neuss, Germany) under the trade name of CYMEL 303.

Cross-linkable phenoplast resins may also be used, for example the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol. Examples of suitable cross-linking phenoplast (i.e. phenolic) resins include (co)polymers containing two or more hydroxyl functional groups and which are substantially free of mobile BPA, BPF, BADGE and BFDGE.

In certain preferred embodiments, phenol-formaldehyde cross-linkers of the resole type may be used, for example phenol, butylphenol, xylenol- and cresol-formaldehyde types, the types specifically etherified with butanol being preferred for protective container coatings [see, for example, Zeno Wicks, Jr., Frank N. Jones and S. Peter Pappas, *Organic Coatings: Science and Technology*, Vol. 1, pp. 184-186 (John Wiley & Sons: New York, 1992)].

Suitable phenoplast and aminoplast cross-linkers are commercially available. Examples of suitable commercially available phenol-formaldehyde cross-linkable resins include those known by the tradenames DUREZ™ and VARCUM™ from DUREZ Corp. (Dallas, Tex.) or Reichhold Chemical AG (Austria); (CO)POLYMEROX™ from Monsanto Chemical Co. (St. Louis, Mo.); AROFENE™ and AROTAP™ from Ashland Chemical Co. (Dublin, Ohio); and BAKELITE™ from Bakelite A.G. (Iserlohn, Germany).

In addition to the functional polyester resin and the cross-linker, the coating composition also contains a phenolic resin, preferably a phenol-formaldehyde resin at from about 0.5% to about 10%, more preferably from about 1% to about 5% w/w of the coating composition on a non-volatile solids basis. The choice of particular phenolic resin typically depends on the particular product being formulated. For example, some coating compositions are highly colored (e.g., gold-colored coatings). These coatings may typically be formulated using phenol-formaldehyde resins that tend to have a red or yellowish color. In contrast, white or clear coatings are generally formulated using non-yellowing resole-formaldehyde resins, or only a small amount of a yellowing resin. Preferred phenol-formaldehyde resins are substantially free of mobile BPA, BPF, BADGE and BFDGE.

Preferably, the phenol-formaldehyde resin is a polymeric material, more preferably a (co)polymer. Preferably, the phenol-formaldehyde resin contains at least two hydroxyl groups capable of undergoing chemical reaction with at least one or more of the functional polyester resin and/or the cross-linker, thereby effecting cross-linking within the coating composition upon curing.

Suitable phenol-formaldehyde resins are commercially available. Examples of commercially available phenol-formaldehyde resins include those known by the tradenames DUREZ™ and VARCUM™ from DUREZ Corp. (Dallas, Tex.) or Reichhold Chemical AG (Austria); (CO)POLYMEROX™ from Monsanto Chemical Co. (St. Louis, Mo.); AROFENE™ and AROTAP™ from Ashland Chemical Co. (Dublin, Ohio); and BAKELITE™ from Bakelite A.G. (Iserlohn, Germany). A presently preferred commercial phenol-formaldehyde resin is BAKELITE™ PF6520 LB.

In certain presently preferred embodiments, a resole-formaldehyde resin not derived from BPA or Novolac diglycidyl ether (NOGE) may be used in combination with a phenol-formaldehyde resin to impart improved characteristics to the cured protective coating composition. While not wishing to be bound by any particular theory, applicants presently believe that a phenol-formaldehyde resin may impart improved acid resistance to a cured protective coating composition, while a resole-formaldehyde resin may impart improved flexibility to a cured protective coating composition.

A presently preferred commercial resole-formaldehyde resin is BAKELITE™ HARZ 9989 LB. More preferably, a combination of BAKELITE™ HARZ 9989 LB and BAKELITE™ PF6520 LB is used in the coating composition, preferably at a weight ratio of from about 1 to 1 to about 4 to 1, more preferably from about 2 to 1 to about 3 to 1 on a weight basis of BAKELITE™ HARZ 9989 LB to BAKELITE™ PF6520 LB based on non-volatile solids.

As noted above, in some presently preferred embodiments, the phenol-formaldehyde resin is also cross-linkable. In other exemplary embodiments, the phenol-formaldehyde resin may be used in conjunction with one or more suitable cross-linkable aminoplast resins including, for example: benzoguanamine-formaldehyde (co)polymers, melamine-formaldehyde (co)polymers, esterified melamine-formaldehyde (co) polymers, and urea-formaldehyde (co)polymers. One example of a suitable cross-linkable aminoplast resin is CYMEL 303 (Cytec Industries, Neuss, Germany).

Optional Ingredients

The types of coating compositions that are found to be most effective in the present invention are those that combine a functional polyester resin with a cross-linker and a phenolic resin in the coating composition. A carrier liquid is thus not an essential ingredient of the coating composition. If an optional carrier liquid is used, it is typically a substantially nonaqueous organic solvent or solvent blend in order to effect more rapid removal of the carrier liquid and effect more rapid curing of the under-coat composition upon application to the substrate.

A substantially nonaqueous organic solvent can include a relatively low amount of water, such as up to about five percent by total weight of the coating composition, without adversely affecting the metal corrosion-inhibiting properties of the over-coat coating composition, either prior to or after curing. The water can be added to the composition intentionally, or can be present in the composition inadvertently, such as when water is present in a particular component included in the coating composition.

Substantially nonaqueous organic solvents or organic solvent blends may be used advantageously as the carrier liquid, for example, to obtain more favorable coating rheology, to achieve faster drying or cure times, or to effectively dissolve or solvate another component of the coating composition (e.g. the functional polyester resin or the cross-linker). In general, the substantially nonaqueous carrier liquid is selected to have sufficient volatility to evaporate essentially entirely from the coating composition during the curing process, such as during heating at about 175-205° C. for about 8 to about 12 minutes.

Organic solvents that are particularly useful as optional carrier liquids include aliphatic hydrocarbons (e.g. mineral spirits, kerosene, high flashpoint VM&P naptha, and the like); aromatic hydrocarbons (e.g. benzene, toluene, xylene, solvent naphtha 100, 150, 200 and the like); alcohols (e.g. ethanol. n-propanol, isopropanol, n-butanol, iso-butanol and the like); ketones (e.g. acetone, 2-butanone, cyclohexanone, methyl aryl ketones, ethyl aryl ketones, methyl isoamyl ketones, and the like); esters (e.g. ethyl acetate, butyl acetate and the like); glycols (e.g. butyl glycol), glycol ethers (e.g. methoxypropanol); glycol ethers (e.g. ethylene glycol monomethyl ether, ethylene glycol monoethyl ether, ethylene glycol monobutyl ether, propylene glycol monomethyl ether, and the like); glycol esters (e.g. butyl glycol acetate, methoxypropyl acetate and the like); and mixtures thereof.

The amount of nonaqueous carrier included in the coating composition is limited primarily by the desired, or necessary, rheological properties for application of the composition to the substrate. Usually, a sufficient amount of nonaqueous carrier is included in the coating composition to provide a composition that can be processed easily and that can be applied to a metal substrate easily and uniformly, and that is sufficiently removed from the coating composition during curing within the desired cure time.

Therefore, essentially any substantially nonaqueous carrier is useful in the present coating composition as long as the substantially nonaqueous carrier adequately disperses and/or solubilizes the coating composition components; is inert with respect to interacting with composition components; does not adversely affect the stability of the coating composition or the ability of the corrosion-inhibition coating to inhibit corrosion of a metal substrate; evaporates quickly, essentially entirely, and relatively rapidly to provide a cured coating composition that inhibits the corrosion of a metal substrate, demonstrates good adhesion and flexibility, and has good chemical and physical properties.

One optional ingredient is a catalyst to increase the rate of cure or cross-linking in the coating compositions. Generally, acid catalysts may be used to accelerate the rate of cure of the coating compositions. The catalyst is typically present in an amount of 0.05% to about 5%, and preferably about 0.1% to about 1.5%, by weight of nonvolatile material.

Examples of suitable catalysts, include, but are not limited to, quaternary ammonium compounds, phosphorous compounds, and tin and zinc compounds, like a tetraalkyl ammonium halide, a tetraalkyl or tetraaryl phosphonium iodide or acetate, tin octoate, zinc octoate, triphenylphosphine, and similar catalysts known to persons skilled in the art.

Catalysts that may be suitable for accelerating the rate of cure of the coating composition include, for example, phosphoric acid solutions (e.g. an 85% aqueous phosphoric acid solution in butyl glycol at a 1:1 weight ratio), phosphoric acid ester solutions (e.g. ADDITOL XK 406™, available from Cytec Surface Specialties, Inc., West Paterson, N.J.), dodecylbenzene sulfonic acid (e.g. CYCAT 600™ available from Cytec Surface Specialties, Inc., West Paterson, N.J.), and aluminum catalysts (e.g. aluminum sec-butoxide, AKZO-Nobel Chemicals, Inc., Chicago, Ill.).

In certain presently preferred embodiments, tin catalysts are used for accelerating the rate of cure of the coating composition, preferably a mixture of mono- and di-octyl tin-mercaptides (e.g. TINSTAB OTS 17 MS™ available from AKZO-Nobel Chemicals, Inc., Chicago, Ill.), or dibutyltin dilaurate (e.g. FASCA™ available from Atofina Chemicals, Inc., Philadelphia, Pa.). One presently preferred catalyst is RD4169 (Tegocoat 722™, available from Goldschmidt TIB GmBH, Mannheim, Germany @ 20% w/w in Aromatic Solvent 100).

Coating compositions that are to be used as protective coatings for metal substrates optionally include a natural or synthetic lubricant. Suitable lubricants include, for example, long-chain aliphatic waxes, carnuba waxes, natural and synthetic wax dispersions (e.g. Lanco Glidd 4518V available from Lubrizol, Corp., Wickliffe, Ohio), poly(tetrafluoroethylene) waxes, and mixtures, blends or dispersions thereof. Preferred lubricants include Luba-Print 887/C Wax Dispersion (a carnuba wax dispersion available from L. P. Bader & Co., GmbH, Rottweil, Germany) and L16832 (a partially hydrated frying oil derived from sunflower seeds @ 20% w/w in Solvent Naptha 150™ available from Unilever, Corp., Austria).

In some embodiments, a pigment can be added to the coating compositions. Suitable pigments, such as aluminum flake, titanium dioxide and zinc oxide, may be added to improve the appearance of the protective coating, or to act as scavengers for hydrogen sulfide emitted by foodstuffs that acts to stain or darken the protective coating. A pigment like aluminum flake can be present in the coating compositions, typically at a concentration from about two to about 15 percent by weight, more typically from about five to about 10 percent by weight of the composition on a non-volatile solids basis. A pigment like titanium dioxide can also be present in the coating compositions, typically in an amount from about 35% to about 50% by weight, more typically from about 40 to about 45 percent by weight of the coating composition on a non-volatile solids basis. Zinc oxide can also be present in the coating compositions, typically in an amount from about 0.5% to about 30% by weight, more typically from about five to about 15 percent by weight of the coating composition on a non-volatile solids basis.

In some embodiments, one or more additional (co)polymer components may be added to the coating compositions. Suitable (co)polymers include solution vinyl (PVC) (co)polymers, solution poly(vinyl)butyral (co)polymers, dispersed or solution meth(acrylic) copolymers, and solution polyester resins. Suitable polymers are commercially available, and include UCAR™ solution vinyl (co)polymers (available from Dow Chemical Co., Midland Mich.), BUTVAR™ solution poly(vinyl)butyral (co)polymers (available from Solutia, Inc., Philadelphia, Pa.), ELVACITE solution (meth)acrylic (co)polymers, and VITEL™ solution polyester resins.

Depending upon the desired application, the coating compositions may include other additives such as water, coalescing solvents, leveling agents, surfactants, wetting agents, dispersants (e.g. lecithin), defoamers (e.g. modified (poly) siloxanes), thickening agents (e.g. methyl cellulose), cure accelerators, suspending agents, adhesion promoters, cross-linking agents, corrosion inhibitors, fillers (e.g. titanium dioxide, zinc oxide, aluminum), matting agents (e.g. precipitated silica) and the like. Presently preferred additives include BYK-357 (available from BYK-Chemie, GmBH, Wesel, Germany) and POLYSLIP VS 86 (available from Rohm & Haas Corp., Philadelphia, Pa.).

available from Dow Chemical Co., Midland, Mich.).

Production and Use of the Exemplary Coating Compositions

The present invention also provides a method of coating a metal substrate with hardenable coating compositions including a functional polyester resin, a cross-linker, and a phenol-formaldehyde resin. In certain presently preferred embodiments, the hardenable coating compositions include a functional polyester resin and a blocked isocyanate cross-linker. In certain more preferred embodiments, the hardenable coating compositions include a hydroxyl-functional polyester resin, a carboxyl-functional polyester resin, a blocked isocyanate cross-linker, and optionally, a cresol-formaldehyde resin, a substantially nonaqueous carrier liquid, a catalyst and a pigment.

In presently preferred embodiments, a method of coating a metal substrate to provide a composite material is provided wherein the composite material is completely free of BPA, BPF, BADGE and BFDGE. In certain preferred embodiments, the coating composition is substantially free of mobile BPA, BPF, BADGE and BFDGE. The composite material is particularly useful in fabricating metal foodstuffs storage containers, including multi-part containers having "easy-open" end closures, wherein the hardened protective coating contacts the foodstuffs.

Further provided is a metal foodstuffs storage container derived from a metal substrate having at least one surface substantially coated with the hardened coating composition that is substantially free of mobile BPA, BPF, BADGE and BFDGE. Exemplary metal substrate protective coating compositions of the present invention may be used as protective surface coatings in fabricating metal packages of tinplate, electrolytic tinplate, aluminum and tin free steel. Exemplary coating systems may be used for both the interior and exterior coating of three-piece and deep-drawn metal foodstuff containers, but are particularly preferred for interior coating of foodstuff containers and "easy open" end closures, wherein the hardened protective coating contacts the foodstuff.

The coating compositions of the present invention may be prepared by conventional methods in various ways. For example, the coating compositions may be prepared by simply admixing the functional polyester resin, the cross-linker, the phenol-formaldehyde resin, and any optional ingredients, in any desired order, with sufficient agitation. The resulting mixture may be admixed until all the composition ingredients are substantially homogeneously blended.

Alternatively, the coating compositions may be prepared as a liquid solution or dispersion by admixing to an optional substantially nonaqueous carrier liquid the functional polyester resin, the cross-linker, the phenol-formaldehyde resin, and any optional ingredients, in any desired order, with sufficient agitation. An additional amount of a substantially non-aqueous carrier liquid may be added to the coating compositions to adjust the amount of nonvolatile material in the coating composition to a desirable level for effective coating. For example, the coating composition may be prepared by adding the phenolic (co)polymer material to a solution of the polyester resin in a solvent mixture that may include a ketone, an ester, aromatic solvents and a small amount of water.

Where, as preferred, the coating composition is applied as a liquid coating, the coating composition is typically produced by intensive mixing of the raw materials at temperatures of from about 10° C. to about 40° C., more preferably from about 15° C. to about 35° C., to obtain a substantially homogenous liquid. When applied as a liquid coating, the coating composition typically exhibits a solids content from about 20% to about 70% by weight nonvolatile material, more preferably from about 25% to about 50% by weight nonvolatile material.

The coating composition is preferably applied as a dispersion of solids in a substantially nonaqueous carrier liquid, and preferably exhibits a solids content from about 5% to about 70%, more preferably from about 15% to about 65% by weight, most preferably from about 25% to about 50% by weight nonvolatile material.

If the coating compositions are prepared with optional particulate components, such as a pigment, the steps of preparation may be varied accordingly. In particular, the coating composition may preferably be produced by intensive mixing or media-milling of the raw materials at temperatures of from about 10° C. to about 40° C., more preferably from about 15° C. to about 35° C., to obtain a substantially homogenous solid/liquid dispersion. In embodiments of the present invention that incorporate pigments, such as aluminum flake, zinc oxide and titanium dioxide, the resulting pigmented coating composition typically has a pigment-to-binder ratio of about 0.5:1 to about 0.85:1, and more typically about 0.6:1 to about 0.7:1. Pigment-to-binder ratio is a measure, on the basis of weight, of parts of pigment for every 1 part of (co)polymer, or non-pigment, which includes all coating components that are not pigment and not volatilized after the curing step.

The hardenable coating compositions of the present invention are useful as protective coatings to prevent contamination of foodstuffs contained in a metal packaging container by the packaging metal or the protective lacquer, and to prevent attack by the foodstuffs on the metal container. The inventive protective coating compositions are particularly effective at imparting resistance to attack by acidic foodstuffs and beverages. The compositions are especially useful in coating food or beverage cans, particularly the interiors of such cans. Their virtually undetectable levels of BPA, BPF, BADGE and BFDGE and their other chemical, physical and mechanical properties make them particularly desirable compositions for coating the interior of multi-part foodstuffs storage containers.

The aforementioned coating compositions are particularly well adapted for use as an internal surface coating for multi-part foodstuffs packaging containers (e.g., two-piece cans, three-piece cans, etc.). Two-piece cans are manufactured by joining a can body (typically a drawn metal body) with a can end closure (typically a drawn metal end). The inventive coating compositions are well suited for use in food contact situations and may be used on the inside of such cans and components used in fabricating foodstuffs containers. The coating systems of the present invention are particularly well suited for providing a protective coating to the interior surface of "easy-open" end closures used in fabricating containers for foodstuffs and beverages, particularly for vacuum-packed foodstuffs.

Protective coatings for fabricating food and beverage containers may be applied to metal substrates and cured into films at high speed, on high-speed coating lines (e.g., coil coating lines). The coating agents are applied in the roller coating process either continuously on coil lines or batch-wise on sheet coating lines to thin metals such as aluminum, tinplate, tin free steel or chromed steel, and then reacted at high temperatures. The coated metals thus produced are then shaped to form the desired metal packaging articles by processes such as, for example, deep-drawing, stamping, creasing and flanging. This machining requires very high flexibility and excellent adhesion of the coating agents used. The protective coatings thus should preferably not experience any change in protective function due to the reshaping processes and should preferably exhibit good substrate adhesion and intact film surfaces after processing into containers.

Modern high-speed coil coating lines require coatings that will dry and cure within a few seconds when heated rapidly to peak metal temperatures of 420° F. to 550° F. (about 215° C. to about 300° C.). Many metal packaging articles, after filling with the foods, are subjected to exposure to similar high temperature in thermal processes for food preservation (e.g. pasteurization or sterilization). After these high temperature thermal processes, the protective coatings ideally exhibit little or no change with respect to protective function, adhesion, flexibility, appearance, or chemical composition.

The inventive coating compositions may generally be applied as coatings to a variety of metal substrates such as tinplate, tin free steel, aluminum and its alloys, and the like. The compositions may be applied as a film by conventional means such as brushing, roller coating or spraying. Roller coating is the preferred method when coating flat metal coils or sheets for can manufacture, and spraying is typically preferred when coating preformed cans.

Preferably, the coating compositions are applied as a substantially uniform and continuous defect-free layer or film directly on the metallic substrate, although in some embodiments, a primer layer may be applied to the metal substrate before application of the coating compositions according to the present invention. Preferably, the cured coating compositions are substantially free from surface defects, such as, for example, craters, pinholes, and de-wet regions.

Metal coatings are generally applied to metal sheets in one of two ways, each of which involves different coating and curing conditions. The coated metal sheets may be fabricated into can bodies or ends in a later stage of the manufacturing operation. One process, called the sheet bake process, involves roll coating large metal sheets. These sheets are then placed upright in racks and the racks are typically placed in ovens for about 10 minutes to achieve peak metal temperatures of about 180° C. to about 205° C. In a second process known as coil coating, large rolls of thin gage metal (e.g., steel or aluminum) are unwound, roll coated, heat cured and rewound. During the coil coating process, the total residence time in the curing ovens will vary from about 2 seconds to about 20 seconds with peak metal temperatures typically reaching about 215° C. to about 300° C.

The present invention may be useful as a spray applied, liquid coating for the interior of two-piece drawn and ironed tinplate food cans (i.e. "tinplate D&I cans"). The present invention also offers utility in other metal substrate coating applications. These additional applications include, but are not limited to: coil coating, sheet coating, and the like.

A coil coating is described as the coating of a continuous coil or scroll composed of a metal (e.g., steel or aluminum). Once coated, the coating coil is subjected to a short thermal, and/or ultraviolet and/or electromagnetic curing cycle, which lead to the drying and curing of the coating. Coil coatings provide coated metal (e.g., steel and/or aluminum) substrates that can be fabricated into formed articles such as 2-piece drawn food cans, 3-piece food cans, food can ends, drawn and ironed cans, beverage can ends and the like.

A sheet coating is described as the coating of separate pieces of a variety of materials (e.g., steel or aluminum) that have been pre-cut into square or rectangular 'sheets'. Typical dimensions of these sheets are approximately one square meter. Once coated, each sheet is cured. Once dried and cured, the sheets of the coated substrate are collected and prepared for subsequent fabrication. Coil coatings provide coated metal (e.g., steel or aluminum) substrate that can be successfully fabricated into formed articles such as 2-piece drawn food cans, 3-piece food cans, food can ends, drawn and ironed cans, beverage can ends and the like.

The method of the present invention includes applying a first hardenable coating composition to at least one surface of a metal substrate; applying a second hardenable coating composition over the first hardenable coating composition, wherein the second hardenable coating composition includes a hydroxyl-functional polyester resin, a carboxyl-functional polyester resin, a cross-linker, and a phenol-formaldehyde resin; and curing the first and second hardenable coating compositions to provide a hardened composite coating on the metal substrate.

One skilled in the art understands that the first and second hardenable coating compositions may be applied in a single pass, in multiple passes, or in combination with additional coating layers placed between the metal substrate and the first hardenable coating composition (e.g. a primer), or on top of the second coating layer (e.g. a size coat or lacquer). In some presently preferred embodiments, the coating compositions of the present invention are applied in two or more sequential passes to form a multi-layer composite coating. In exemplary embodiments, the first hardenable coating composition has a chemical composition that is chemically distinct from the second hardenable coating. In certain presently preferred embodiments, the first hardenable coating composition has a chemical composition that is substantially identical to the chemical composition of the second hardenable coating composition.

One skilled in the art further understands that "substantially identical" coating compositions may have minor variations in chemical composition with respect to the chemical nature and concentration of optional ingredients such as solvents, catalysts, pigments, and the like; and in the overall percent non-volatile material in the coating compositions. However, the independently claimed constituents of each hardenable coating composition (e.g. the hydroxyl-functional and carboxyl-functional polyester resins, the cross-linker and the phenol-formaldehyde resin) are preferably present at the same relative weight ratio on a non-volatile solids basis in "substantially identical" coating compositions.

In other presently preferred embodiments, each of the first and second hardenable coating compositions preferably exhibits a dry coating weight of from about 6 to about 12 grams per square meter ($g/m^2$) on a non-volatile solids basis. The preferred method of applying the first and second hardenable coating compositions to the metal substrate is roll coating, for example, by direct roll coating, reverse roll coating, rotogravure coating, and the like. The present coating compositions can generally be roll coated to produce cured composite films having overall dry coating weights of from about 12 $g/m^2$ to about 24 $g/m^2$.

In certain presently preferred embodiments, the first and second hardenable coating compositions on the surface of the metal substrate are at least partially cured (i.e. hardened or cross-linked) by exposure to heat, actinic radiation (e.g. ultraviolet or infrared curing), electromagnetic radiation (e.g. electron beam curing), combinations thereof and the like. In certain most preferred embodiments, the first hardenable coating composition on the surface of the metal substrate is at least partially cured before applying the second hardenable coating composition over the first hardenable coating composition and curing the composite layers to produce a hardened composite coating on the metal substrate.

In various exemplary embodiments, each of or preferably both of the applied first and second hardenable coating compositions can be dried and cured by heating to drive off at least a portion of any optional carrier liquids and to accelerate the cross-linking reaction of the cross-linker with one or more of the components of the coating compositions. The coated compositions are typically heated to about 150-220° C. for about 1 to 20 minutes in order to form a hardened and dried film. If the coating is applied using a sheet-bake process, the coated metal substrate is preferably cured at a temperature of about 175° C. to about 205° C. for about 8 to about 10 minutes. In contrast, when the coating is carried out using a coil-coating process, the coated metal substrate is preferably cured by heating for about two to about 20 seconds at a temperature of about 230° C. to about 300° C.

The hardened protective coating compositions of the present invention exhibit good adhesion to both the metal substrate and within the coated composite layers (i.e. inter-coat adhesion). The hardened composite coating compositions on metal substrates may be shaped mechanically to form foodstuffs containers or "easy-open" end closures; for example by deep-drawing, creasing and flanging. After forming, the metal containers may be filled with a foodstuff, and then sterilized. The hardened composite coating compositions of the present invention generally exhibit good flexibility and chemical resistance, especially in the presence of foodstuffs containing acetic acid, citric acid and/or lactic acid, usually without exhibiting loss of adhesion or discoloration.

The examples that follow are intended to illustrate the preparation and use of the presently described invention, but are not intended to be limiting in any way.

EXAMPLES

In the following examples, the inventive coating compositions were applied to metal substrates, cured, and used to fabricate foodstuffs storage containers and particularly metal closures for food or beverage containers. Example 1 illustrates an exemplary coating composition according to the present invention. The exemplary first-coat coating composition comprises a hydroxyl-functional polyester resin, a carboxyl-functional polyester resin, a cross-linker and at least one phenol-formaldehyde resin.

As shown in Table I, the exemplary first-coat coating composition of Example 1 includes a hydroxyl-functional polyester resin (URALAC ZW 5007 SH, available from DSM Resins U.S., Inc., Augusta, Ga.); a caprolactam blocked IPDI (blocked isocyanate) cross-linker (DESMODUR VPLS 2078, available from Bayer A.G., Leverkusen, Germany); a phenol-formaldehyde resin (BAKELITE PF 6520 LB, available from Bakelite A.G., Iserlohn, Germany); two optional resole-formaldehyde resins (PHENODUR PR 285/55IB/B, available from CYTEC Industries, West Paterson, N.J.; and BAKELITE HARZ 9989 LB, available from Bakelite A.G., Iserlohn, Germany); a carboxyl-functional polyester resin (PHENODUR™ VPM 1150/50EPAC, available from CYTEC Industries, West Paterson, N.J.); optional substantially nonaqueous carrier liquids RHODIASOLV RPDE (available from Rhodia, U.S.A., Cranbury, N.J.), Aromatic 100 European (available from Exxon-Mobil Chemical Co., Houston, Tex.) and acetone (available from Dow Oxygenated Solvents, Midland, Mich.); an optional catalyst (R4169, a 20% w/w mixture of TEGOCOA™ 722, available from Goldschmidt TIB GMbH, Mannheim, Germany, in Aromatic 100™ solvent, available from Exxon-Mobil Chemical Co., Houston, Tex.); optional lubricants (LUBA-PRINT 887/C, available from L.P. Bader & Co., GmBH, Rottweil, Germany; and LI 6832, a 20% w/w mixture of partially hydrated frying oil derived from sunflower seeds and available from Unilever™ GMbH, Austria, mixed in Solvent Naptha 150™, available from Exxon-Mobil Chemical Co., Houston, Tex.); and optional coating additives (BYK 357, available from BYK-Chemie, GMBH, Wesel, Germany; and POLYSLIP VS 86, available from Rohm & Haas Corp., Philadelphia, Pa.).

The first nine raw materials were combined in the order listed in Table I, then mixed at a temperature below 40° C. until a fluid, substantially homogenous mixture was obtained. The final four raw materials were then added with additional mixing, and the coating compositions were then immediately coated.

The exemplary coating composition of Example 1 was applied to electroplated tin plate scrolls as either a single-coat or a two-coat coating system in which the first-coat and second-coat were chemically identical compositions. In both the single-coat and two-coat examples, the first-coat compositions were cured for approximately 12 minutes at about 200° C., and the second-coat compositions were cured for approximately ten minutes at about 190° C. The cured first-coat compositions exhibited a coating weight of approximately 8 g/m$^2$, and the cured second-coat compositions exhibited a coating weight of approximately 8-12 g/m$^2$. The resulting composite coated metal substrates were converted into 73 mm diameter end closures and metal cans, which were tested according to the cured film performance methods described below.

TABLE I

Exemplary Cross-linked Polyester Coating Composition (Example 1)

| Raw Material | Amount (kg) |
|---|---|
| URALAC ™ ZW 5007 SH | 90.00 |
| RHODIASOLVE ™ RPDE | 30.00 |
| AROMATIC 100 EUROPEAN | 10.00 |
| DESMODUR ™ VP LS 2078 | 10.00 |
| BAKELITE ™ HARZ 9989 LB | 4.45 |
| BAKELITE ™ PF 6520 LB | 2.80 |
| PHENODUR ™ PR285/55IB/B | 2.70 |
| PHENODUR ™ VPM1150/50EPAC | 0.70 |
| BYK ™ 357 | 1.35 |
| R4169 Catalyst | 0.85 |
| LUBA-PRINT ™ 887/C Wax Dispersion | 1.75 |
| POLYSLIP ™ VS 86 Lubricant | 1.75 |
| L16832 Lubricant | 0.75 |
| TOTAL: | 157.10 |
| Acetone | >100x |
| VPM 1150 | 0.446 |
| (Weight % Non-volatile Solids) | |

Example 2 illustrates an exemplary two-coat coating composition according to the present invention. The exemplary first-coat coating composition of Example 2 comprises one or more functional polyester resin and one or more phenol-formaldehyde resin. As shown in Table II, the exemplary first-coat coating composition includes a saturated polyester resin (URALAC ZW 5363SN, available from DSM Resins, Zwolle, The Netherlands) mixed in a mixture of substantially nonaqueous carrier liquids (Dibasic ester (DBE) and 1-Methoxy-propyl-2 acetate carrier liquids, both available from Dow Oxygenated Solvents, Midland, Mich.); a phenol-formaldehyde resin (BAKELITE 9989LB, available from Bakelite A.G., Iserlohn, Germany), two optional resole-formaldehyde resins (BAKELITE 6581LB, available from Bakelite A.G., Iserlohn, Germany; and PHENODUR PR 612, available from CYTEC Industries, West Paterson, N.J.); an optional substantially nonaqueous carrier liquid (Butyl glycol acetate, available from Dow Oxygenated Solvents, Midland, Mich.); optional catalysts (R4149, 10% w/w BYK™ 310, available from BYK-Chemie, GmBH, Wesel, Germany and mixed in PM acetate (PMA); and 10% w/w CYCA™ 600, available from CYTEC Industries, West Paterson, N.J., mixed with Solvent PM); and an optional coating additive (BYK 357, available from BYK-Chemie, GmBH, Wesel, Germany).

The exemplary second-coat coating composition of Example 2 comprises one or more functional polyester resin, a blocked isocyanate cross-linker and one or more phenol-formaldehyde resin. As shown in Table II, the exemplary second-coat composition includes a mixture of two functional saturated polyester resins (DYNAPOL™ LH 826-05A, a 55% w/w mixture in a substantially nonaqueous carrier liquid available; and DYNAPOL™ LS 436-12, a 60% w/w mixture in a substantially nonaqueous carrier liquid, both available from Degussa, GMBH, Frankfurt, Germany); a caprolactam blocked IPDI (blocked isocyanate) cross-linker (DESMODUR VPLS 2078, available from Bayer A.G., Leverkusen, Germany); a phenol-formaldehyde resin (PHENODUR™ PR308, a 62% w/w mixture in a substantially nonaqueous carrier liquid available from CYTEC Industries, West Paterson, N.J.); optional substantially nonaqueous carrier liquids (RHODIASOLV™ RPDE, available from Rhodia, U.S.A., Cranbury, N.J.; and Butyl glycol acetate, available from Dow Oxygenated Solvents, Midland, Mich.); an optional catalyst (R4165, a mixture of 37.5% w/w META-TIN™ Kat. S26, available from Acima, Buchs, Switzerland; 12.5% w/w FASCAT™ 4102, available from CECA ATO, Paris, France; and 50% w/w of a substantially nonaqueous carrier liquid, Solvesso™ 150, available from Exxon-Mobil Chemical Co., Houston, Tex.); an optional lubricant (LUBA-PRINT 887/C, available from L.P. Bader & Co., GmBH, Rottweil, Germany); and optional coating additives (BYK 357, available from BYK-Chemie, GmBH, Wesel, Germany; ARADUR™ 3380-1, a 35% w/w mixture in PMA available from Huntsmann GMbH, Frankfurt, Germany; BETAFRIT™ 20% w/w in S1150, available from Unilever GMbH, Frankfurt, Germany; and POLYSLIP VS 86, available from Rohm & Haas Corp., Philadelphia, Pa.).

The first-coat composition raw materials of Example 2 were combined in a vessel in the order listed in Table II, then mixed at a temperature below 40° C. until a fluid, substantially homogenous first-coat composition mixture was obtained. The second-coat composition raw materials of Example 2 were combined in a separate vessel in the order listed in Table II, then mixed at a temperature below 40° C. until a fluid, substantially homogenous mixture second-coat composition mixture was obtained.

The exemplary first-coat coating composition of Example 2 was applied to electroplated tin plate (ETP) scrolls, and cured at approximately 200° C. for approximately 12 minutes. The exemplary second-coat coating composition of Example two was then applied over the surface of the first-coat composition, and cured at approximately 200° C. for approximately 12 minutes. The cured first-coat composition exhibited a coating weight of approximately 6 g/m$^2$, and the cured second-coat composition exhibited a coating weight of approximately 12 g/m$^2$. The resulting composite coated metal substrates were converted into 99 mm diameter end closures and metal cans, which were tested according to the cured film performance methods described below.

In addition to the extent of cure of the coatings and their visual aesthetic appearance when coated on the metal substrates, other important characteristics of the cured coating compositions of the present invention typically include: (1) providing a coating capable of adhering to the metal substrate, (2) providing a coating that exhibits excellent flexibility, and (3) enhancing corrosion inhibition of the metal substrate, particularly under sterilization or pasteurization conditions and when exposed to acidic foodstuff simulants.

TABLE II

Exemplary Cross-linked Polyester Two-coat Composition (Example 2)

| Raw Material | Relative Amount (% w/w) |
| --- | --- |
| First-coat Composition | — |
| URALAC ™ ZW 5007 SH | 72.072 |
| Dibasic ester | 3.917 |
| 1-Methoxy-propyl-2-acetate | 3.917 |
| BAKELITE ™ HARZ 9989 LB | 6.737 |
| BAKELITE ™ 6581LB | 4.622 |
| PHENODUR ™ PR612 | 2.546 |
| Byk ™ 357 | 1.175 |
| Byk ™ 310 @ 10% w/w in PMA | 0.470 |
| CYCAT ™ 600 @ 20% w/w in PM | 0.627 |
| Butyl glycol acetate | 3.916 |
| Second-coat Composition | — |
| DYNAPOL ™ LH 826-05A | 57.754 |
| DYNAPOL ™ LS 436-12 | 5.348 |
| RHODIASOLVE ™ RPDE | 8.556 |
| BYK ™ 357 | 0.428 |
| DESMODUR ™ VP LS 2078 | 10.267 |
| ARADUR ™ 3380-1 (35% w/w in PMA) | 2.139 |
| R4165 Catalyst | 0.250 |
| LUBA-PRINT ™ 887/C Wax Dispersion | 0.980 |
| POLYSLIP ™ VS 86 Lubricant | 0.980 |
| L16832 (Betafrit ™ 20% w/w in S150) | 0.606 |
| PHENODUR ™ PR308 | 1.996 |
| Butyl glycol acetate | 10.695 |

Accordingly, the cured composite coatings of Examples 1 and 2 were tested for adhesion to the metal substrate, for flexibility, for ability to inhibit corrosion of the metal substrate and for chemical resistance to model foodstuffs and sterilization conditions. The following test methods are offered to aid in understanding of the present invention and are not to be construed as limiting the scope thereof. The coated composite metal substrates, "easy-open" end closures and multi-part food containers prepared in Examples 1 and 2 were evaluated according to one or more of the following cured film performance tests.

The coating uniformity porosity test method determines the amount of metal substrate surface that has not been effectively coated by the protective coating before sterilization. The extent of metal exposure for metal substrates (e.g. cans or ends) was determined using a WACO enamel rater (Wilkens-Anderson Co., Chicago, Ill.) in 4-second mode using an electrolyte solution consisting of 989.7 grams deionized water, 10 g sodium chloride (NaCl) and 0.3 g Aerosol OT-B (available from CYTEC Industries, West Paterson, N.J.).

If any uncoated metal is present on the surface of the metal substrate, then a current is passed between these two probes and registers as a value on an LED display. The LED displays the conveyed currents in milliamps, or more commonly referred to as 'mAs'. The current that is passed is directly proportional to the amount of metal that has not been effectively covered with coating. The goal is to achieve 100% coating coverage on the metal substrate, which would result in an LED reading of 0.0 mAs.

To assess adhesion, cans and can end closures were subjected to a variety of tests to determine the adhesion of the coating to the metal substrate, including, for example, the cross hatch adhesion (CHA) test. Cross-hatch adhesion tests were performed generally according to ASTM Test Method D 3359—Test Method B. The adhesion rating scale for Example 1 is "A-E", with 'A' meaning that 100% of the coating in this area has maintained adhesion, and "E" meaning that 100% of the coating has been removed from the tested area, and so on.

To evaluate corrosion resistance of the cured films, can ends were sterilized in 1% w/w NaCl in deionized water, 2% w/w lactic acid in deionized water, and 3% w/w acetic acid in deionized water, for about 60 minutes at 131° C. and 15 pounds per square inch (about 1 atmosphere) pressure, after which porosity was determined according to the above method.

In addition, cans were filled with various food simulants and sterilized for about 60 minutes at 128° C. and 15 pounds per square inch (about 1 atmosphere) pressure. These food simulants included:

2% w/w NaCl in tap water;

2% w/w NaCl/acetic acid in deionized water

1% w/w Lactic acid in deionized water

3% w/w Acetic acid in deionized water

"R" (2% w/w citric acid and 0.5% Ascorbic acid in deionized water);

Cysteine Hydrochloride

After sterilization, the visual appearance of the protective coatings was assessed with respect to changes from the initial observation ("unchanged" denotes no change from the initial observation, i.O) with respect to the appearance of surface roughness (roughening of the otherwise smooth surface of the protective coating), blushing (spot-wise discoloration of the surface of the protective coating), and the appearance of sulfo-staining (darkening of the surface of the protective coating) when exposed to cysteine hydrochloride. The visual rating scale for each parameter is qualitative and is defined as follows: None: No visual occurence; Slight: slight visual occurence; Moderate: Frequent visual occurrence; and Heavy: heavy visual occurence. Cross-hatch adhesion (CHA) was also determined on the sterilized protective coatings.

As shown in Table III, the inventive BPA, BPF, BADGE and BFDGE-free coating composition of Example 1, when applied to a metal substrate as a single-pass or two-pass protective coating (i.e. wherein the first-coat composition has a chemical composition substantially identical to the chemical composition of the second-coat composition) and converted to an "easy-open" end closure; exhibited good adhesion, low porosity, and excellent corrosion resistance even after sterilization under highly acidic conditions.

As shown in Table IV, the inventive BPA, BPF, BADGE and BFDGE-free coating composition of Example 2, when applied to a metal substrate as a two-coat protective coating (i.e. wherein the first-coat composition is chemically distinct from the second-coat composition) and converted to an "easy-open" end closure; also exhibited good adhesion, low porosity, and excellent corrosion resistance even after sterilization under acidic conditions.

TABLE III

Performance of Exemplary Single-pass and Two-pass Cross-linked Polyester Coatings

| | Example 1 |
|---|---|
| 73 mm End Closures: Porosity (mA) | |
| Before Sterilization: | 0.2 |
| After Sterilization 3% Acetic Acid for 1 hour @ 131° C. | 0.4 |
| Appearance: | Slightly rough |
| Single-pass: Porosity (mA) | |
| After Sterilization 1 hour @ 128° C. | — |
| 2% NaCl/Deionized Water (CHA) | A |
| Appearance: | Unchanged |
| 2% NaCl/3% Acetic Acid (CHA) | A |
| Appearance: | Unchanged |
| "R" (CHA) | A |
| Appearance: | Unchanged |
| Cysteine HCl (CHA) | A |
| Appearance: | Sulfostaining |
| Two-Pass: Porosity (mA) | |
| After Sterilization 1 hour @ 128° C. | — |
| 2% NaCl/Deionized Water (CHA) | A |
| Appearance: | Unchanged |
| 2% NaCl/3% Acetic Acid (CHA) | A |
| Appearance: | Unchanged |
| "R" (CHA) | A |
| Appearance: | Unchanged |
| Cysteine HCl (CHA) | A |
| Appearance: | Slight sulfostaining |

TABLE IV

Performance of Exemplary Two-coat Cross-linked Polyester Coating

| | Example 2 |
|---|---|
| 99 mm ETP End Closures: Porosity (mA) | |
| Before Sterilization: | 0.6 |
| After Sterilization 1 hour @ 131° C. | — |
| 1% NaCl/Deionized Water | 3.9 |
| 2% Lactic Acid/Deionized Water | 2.7 |
| 3% Acetic Acid/Deionized Water | 9.7 |
| Cross-Hatch Adhesion | |
| After Sterilization 1 hour @ 128° C. | — |
| 2% NaCl/Deionized Water (CHA) | A |
| Appearance: | Unchanged |
| 2% NaCl/3% Acetic Acid (CHA) | A |
| Appearance: | Small Blisters on Beading |
| "R" (CHA) | A |
| Appearance: | Unchanged |
| Cysteine HCl (CHA) | A |
| Appearance: | Blushing |

The above specification, examples and data provide a written description of the BPA, BPF, BADGE and BFDGE-free, hardenable coating compositions of the present invention, as well as the methods of making and methods of using the metal substrate coating system to produce metal foodstuffs storage containers and end closures according to the present invention. Various preferred embodiments of the invention were also described. These and other embodiments of the invention reside within the scope of the following claims.

We claim:

1. A composition comprising:
a hydroxyl-functional polyester resin,
a carboxyl-functional polyester resin having an acid number from about 100 to about 300 milligrams KOH per gram,
a cross-linker, and
one or more phenol-formaldehyde resin;
wherein the composition is in the form of a hardenable coating composition and is substantially free of BPA, BPF, BADGE and BFDGE.

2. The composition of claim 1, wherein the hydroxyl-functional polyester resin exhibits a hydroxyl number from about 5 to about 200 milligrams KOH per gram.

3. The composition of claim 1, wherein the hydroxyl-functional polyester resin exhibits a number average molecular weight from about 1,000 to about 7,500 Daltons.

4. The composition of claim 1, wherein the hydroxyl-functional polyester resin is present in an amount from about 75 to about 90 percent by weight of the hardenable coating composition on a non-volatile solids basis.

5. The composition of claim 1, wherein the carboxyl-functional polyester resin exhibits a number average molecular weight from about 2,000 to about 5,000 Daltons.

6. The composition of claim 1, wherein the carboxyl-functional polyester resin is present in an amount from about 0.1 to about 5 percent by weight of the hardenable coating composition on a non-volatile solids basis.

7. The composition of claim 1, wherein the cross-linker is selected from one or more of the group consisting of a phenoplast cross-linker, an aminoplast cross-linker and a blocked isocyanate cross-linker.

8. The composition of claim 1, wherein the cross-linker is a blocked isocyanate cross-linker present in an amount from about 1 to about 5 percent by weight of the hardenable coating composition on a non-volatile solids basis.

9. The composition of claim 1, wherein the phenol-formaldehyde resin is present in an amount from about 1 to about 5 percent by weight of the hardenable coating composition on a non-volatile solids basis.

10. The composition of claim 1, further comprising a resole-formaldehyde resin.

11. The composition of claim 10, wherein the resole-formaldehyde resin is present in an amount from about 2 to about 5 percent by weight of the hardenable coating composition on a non-volatile solids basis.

12. The composition of claim 1, further comprising a substantially nonaqueous carrier liquid.

13. The composition of claim 1, further comprising from about 0.1 to about 5 weight percent of a catalyst on a non-volatile solids basis.

14. The composition of claim 1, further comprising a pigment.

15. A composition, comprising:
one or more functional polyester resin having at least one hydroxyl group, at least one carboxylic group, a hydroxyl number from about 5 to about 150 milligrams KOH per gram, and an acid number of from about 50 to about 250 milligrams KOH per gram,
a cross-linker, and
one or more phenol-formaldehyde resin;
wherein the composition is in the form of a hardenable coating composition and is substantially free of BPA, BPF, BADGE and BFDGE.

16. A method of applying a hardenable coating composition to a metal substrate, comprising:

applying a first hardenable coating composition to at least one surface of a substrate, applying a second hardenable coating composition over the first hardenable coating composition, said second hardenable coating composition including:

a hydroxyl-functional polyester resin, a carboxyl-functional polyester resin having an acid number from about 100 to about 300 milligrams KOH per gram, a cross-linker, and a phenol-formaldehyde resin, wherein the second hardenable coating composition is substantially free of BPA, BPF, BADGE and BFDGE; and curing the first and second hardenable coating compositions to provide a hardened composite coating on the metal substrate.

17. The method of claim 16, wherein the first hardenable coating composition is substantially identical in chemical composition to the second hardenable coating composition.

18. The method of claim 16, wherein each of the first and second hardenable coating compositions is applied at a coating weight of from about 6 to about 12 grams per square meter on a non-volatile solids basis.

19. A metal foodstuffs container having at least an interior surface coated with a hardened coating composition produced according to the method of claim 16.

20. A metal foodstuffs container according to claim 19, wherein the metal foodstuffs container is a multi-part can having at least one easy-open end closure with at least an interior surface of the easy-open end closure coated with a hardened coating composition according to the method of claim 16.

21. The composition of claim 15, wherein the cross-linker comprises a blocked isocyanate cross-linker.

* * * * *